United States Patent
Tseytin

(10) Patent No.: US 7,660,962 B2
(45) Date of Patent: Feb. 9, 2010

(54) USE OF MEMORY COMPRESSION ALGORITHM TO ASSESS EFFICIENCY OF MEMORY USAGE

(75) Inventor: Gregory S. Tseytin, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 11/306,085

(22) Filed: Dec. 15, 2005

(65) Prior Publication Data

US 2007/0143558 A1 Jun. 21, 2007

(51) Int. Cl.
G06F 12/02 (2006.01)
(52) U.S. Cl. .................. 711/171; 711/161; 711/162
(58) Field of Classification Search .............. 711/161, 711/162, 170, 171
See application file for complete search history.

(56) References Cited

U.S. PATENT DOCUMENTS

| | | | | |
|---|---|---|---|---|
| 5,793,937 A | * | 8/1998 | Chura et al. | 358/1.16 |
| 5,805,932 A | * | 9/1998 | Kawashima et al. | 710/68 |
| 6,337,747 B1 | * | 1/2002 | Rosenthal | 358/1.15 |
| 7,117,294 B1 | * | 10/2006 | Mi et al. | 711/101 |
| 2005/0071598 A1 | * | 3/2005 | Luick | 711/170 |

* cited by examiner

Primary Examiner—Hetul Patel
(74) Attorney, Agent, or Firm—Cuenot, Forsythe & Kim, LLC

(57) ABSTRACT

A method of monitoring runtime memory usage by a program. The method can include retrieving data from a first region of virtual memory that has been allocated to the program and compressing the data. A data compression rate can be measured. The method further can include generating a notification comprising notification data indicating that the first region of memory was not efficiently used by the program during execution when the data compression exceeds a threshold value or the data compression rate exceeds a statistical value determined from an application's memory usage.

17 Claims, 1 Drawing Sheet

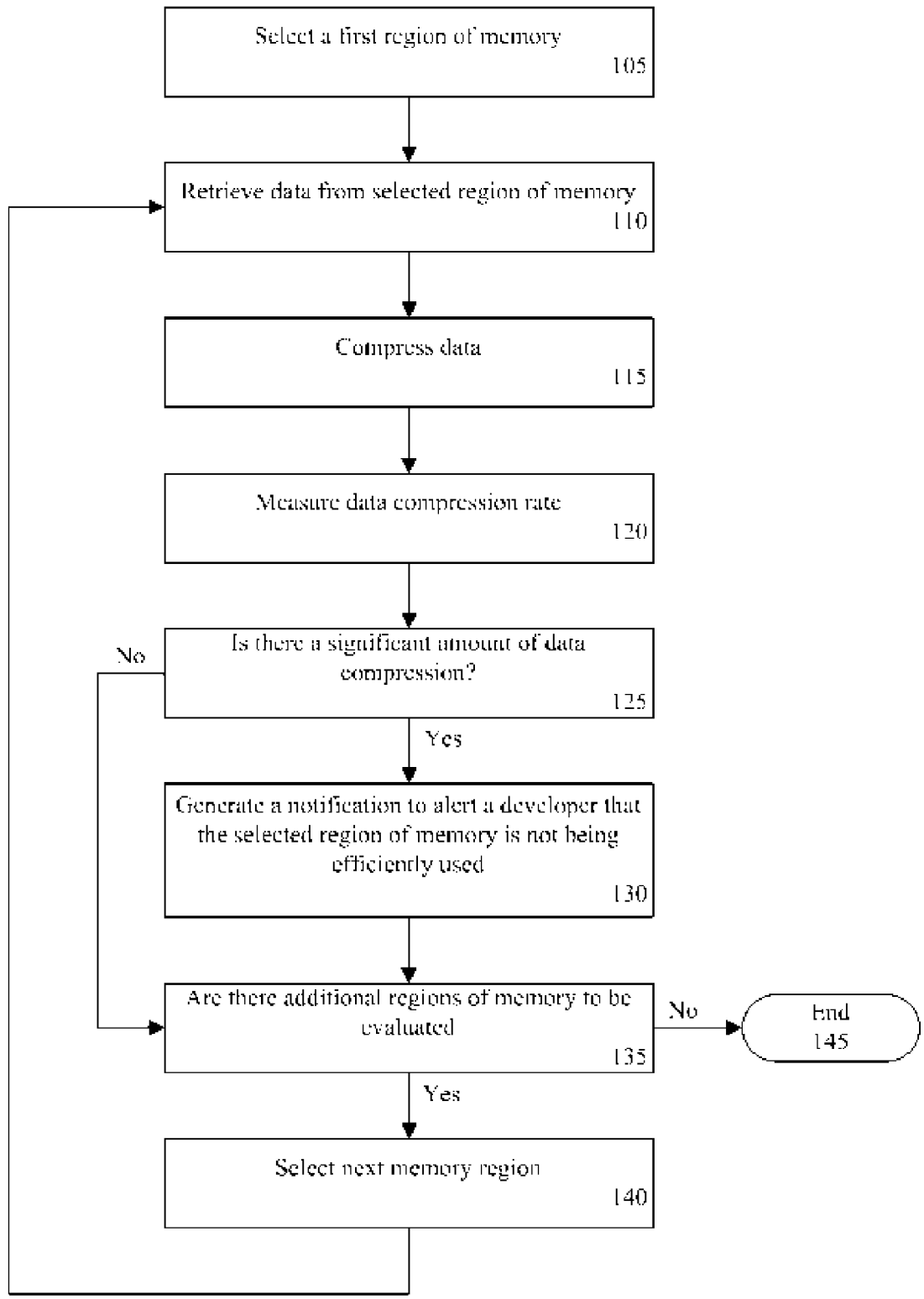

USE OF MEMORY COMPRESSION ALGORITHM TO ASSESS EFFICIENCY OF MEMORY USAGE

FIELD OF THE INVENTION

The present invention relates to software development tools and, more particularly, to tools for monitoring memory usage.

BACKGROUND OF THE INVENTION

Modern computing systems utilize virtual (or logical) memory. Virtual memory is a concept that, when implemented by a computer and its operating system, maps virtual storage addresses to physical storage addresses, which generally frees software programmers from being concerned about the availability of data storage. Virtual memory also allows programmers to use a contiguous range of memory, or storage addresses for stored data, that may be larger than the amount of physical memory (RAM) available to the computer.

In addition to managing the mapping of virtual storage addresses to real storage addresses, a computer implementing virtual memory also manages storage swapping between active storage (RAM) and hard disks or other high volume storage devices. Virtual storage is typically committed in units called "pages" that form virtual memory regions ranging from a few kilobytes up to several megabytes in size. Managing storage in this manner allows multiple programs to safely run simultaneously on the computer.

In certain programming languages, including C and Pascal, heaps are used to manage allocation of virtual memory. A heap is an area of pre-reserved storage that a program process can use to store data in some calculatable amount that won't be known until the program is running. For example, a program may accept different amounts of input from one or more users for processing and then perform processing on all the input data at once. Having a certain amount of heap storage already obtained from the operating system facilitates storage management and is generally more efficient than asking the operating system for storage every time it is needed. A process manages its allocated heap by requesting heap memory blocks as needed and returning the blocks when they are no longer needed. Heaps often become fragmented, wasting memory in the virtual address space and, correspondingly, wasting space in physical memory. Heap fragmentation can also contribute to memory overhead that can result in "thrashing" and poor system wide performance in a heavily-loaded system.

To aid application developers in optimizing memory usage, it would be beneficial to provide a notification to the developers when memory is not being efficiently used.

SUMMARY OF THE INVENTION

The embodiments disclosed herein relate to monitoring memory usage. One embodiment of the present invention can include a method of monitoring runtime memory usage by a program. The method can include retrieving data from a first region of virtual memory that has been allocated to the program and compressing the data. A data compression rate can be measured. The date compression rate achieved by the lossless compression technique can be measured by identifying an amount of memory space freed by compressing the data using the lossless compression technique and identifying a ratio of the amount of freed memory space with respect to a size of the first region of virtual memory. The method further can include generating a notification comprising notification data indicating that the first region of virtual memory was not efficiently used by the program during execution when the data compression rate exceeds a threshold value. In another arrangement, the notification can be generated when the data compression rate exceeds a statistical value determined from an application's memory usage.

Another embodiment of the present invention can include a computer readable storage being programmed to cause a computer to perform the various steps described herein.

Another embodiment of the present invention can include a machine readable storage being programmed to cause a machine to perform the various steps described herein.

BRIEF DESCRIPTION OF THE DRAWINGS

There are shown in the drawing, embodiments which are presently preferred, it being understood, however, that the invention is not limited to the precise arrangements and instrumentalities shown.

The drawing presents a flowchart illustrating one aspect of using a memory compression algorithm to assess efficiency of memory usage in accordance with the inventive arrangements disclosed herein.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The embodiments disclosed herein relate to a method of monitoring the allocation of memory by an application and determining whether the memory is efficiently used. To assess the efficiency of memory usage, data stored in the allocated memory region can be compressed using a compression algorithm. The compression rate then can be determined. For example, the amount of memory space freed by compressing the data can be compared to the size of the allocated region. If the compression rate is high, for instance the size of the allocated region is significantly larger than the size of the compressed data, a determination can be made that the memory is not efficiently used. A notification of such determination can be generated for review by a user, such as an application developer.

The present invention can be implemented in a runtime analysis tool and can be used to evaluate a given state of memory at runtime. For example, the invention can be implemented in a debugging tool. A break point can be set in an application and the application can be executed, running until the break point is reached. The methods described herein then can be used to analyze the state of the memory at the break point.

In another arrangement, the invention can be implemented to produce instrumented program code through source code insertion or through object code insertion. Both code insertion techniques are known to the skilled artisan. Still, this listing of examples is provided for illustration purposes only, and is not intended to limit the present invention. Indeed, the present invention can be used with other runtime analysis techniques.

The drawing presents a flowchart illustrating a method 100 of using a memory compression algorithm to assess efficiency of memory usage in accordance with the inventive arrangements disclosed herein. Beginning at step 105, a first region of memory can be selected. The region of memory can be a region of physical memory or virtual memory and can be, for example, a page, a heap, a block, a plurality of pages, a plurality of heaps, a plurality of blocks, portion of a page, a portion of a heap, a portion of a block, or any other memory region that can be identified.

The first selected region can be selected in any suitable manner. For example, a memory region used by an application that contains the lowest address of all regions used by the application can be selected. Alternatively, the first selected memory region can be the region that contains the highest address, the first region used by a process of the application, the last region used by a process of the application, a most used memory region, a least used memory region. Still, the invention is not limited in this regard and the first memory region can be selected in any other suitable manner.

At step 110 data can be retrieved from the selected memory region. Continuing to step 115, the data can be compressed using a compression algorithm. Examples of suitable compression algorithms are Lempel-Ziv-Welch (LZW) compression, LZ77, LZ78, Lempel-Ziv-Markov chain-algorithm (LZMA), LZO, Burrows-Wheeler transform, DEFLATE, PPM compression, Shannon-Fano encoding, Truncated binary encoding, Run length encoding, SEQUITAR algorithm, Embedded zero tree wavelet (EZW) and Entropy encoding. Still numerous other algorithms are known to the skilled artisan and the invention is not limited to any specific compression algorithm or algorithms.

At step 120 the data compression rate can be measured. For example, the amount of space freed by the compression process can be compared to the size of the memory region from which the data was retrieved to generate a ratio. The data compression rate can be equal or proportional to the ratio.

Proceeding to decision box 125, a determination can be made as to whether there is a significant amount of data compression. To make this determination, the data compression rate can be compared to a threshold value or in any other suitable parameter(s). For instance, the data compression rate can be compared to statistical data, such as an average or a percentile, correlating to the applications memory usage.

If it is determined that a significant amount of data compression on the retrieved data has occurred, the process can continue to step 130 and a notification can be generated. The notification can alert a user, such as a developer, that the selected region of memory is not being efficiently used. The notification can be data stored to a data file, such as a data log, a text file or a data base, presented to the developer in a graphical user interface (GUI), or processed in any other manner suitable to inform the user of the inefficient use of memory.

Proceeding to decision box 135, if there are no additional regions of memory to be evaluated the process can end at step 145. For example, if there are no additional memory regions used by the application under test, or a process under test, then the process can end. If, however, there are additional memory regions to be evaluated, the process can continue to step 140 and a next memory region can be selected. The process then can proceed to step 110 and repeat until there are no additional regions of memory to be evaluated.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic-link library and/or other sequence of instructions designed for execution on a processing system.

The terms "a" and "an," as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically, i.e. communicatively linked through a communication channel or pathway.

This invention can be embodied in other forms without departing from the spirit or essential attributes thereof. Accordingly, reference should be made to the following claims, rather than to the foregoing specification, as indicating the scope of the invention.

What is claimed is:

1. A method of monitoring runtime memory usage by a program, the method comprising:

retrieving data from a first region of virtual memory that has been allocated to the program;

compressing the data using a lossless compression technique;

measuring a data compression rate achieved by the lossless compression technique by identifying an amount of memory space freed by compressing the data using the lossless compression technique and identifying a ratio of the amount of freed memory space with respect to a size of the first region of virtual memory; and generating a notification comprising notification data indicating that the first region of the virtual memory was not efficiently used by the program during execution when the data compression rate exceeds a threshold value.

2. The method of claim 1, wherein the data compression rate is proportional to the ratio.

3. The method of claim 2, wherein the data compression rate is equal to the ratio.

4. The method of claim 1, wherein generating the notification comprises storing notification data to a data file.

5. The method of claim 1, wherein generating the notification comprises presenting notification data in a graphical user interface (GUI).

6. The method of claim 1, further comprising:

retrieving data from at least a second region of the virtual memory;

compressing the data from the second region of the virtual memory;

measuring a second data compression rate for the compressed data from the second region of the virtual memory; and generating a notification comprising notification data indicating that the second region of the virtual memory was not efficiently used by the program during execution when the second data compression rate exceeds the threshold value.

7. A method of monitoring runtime memory usage by a program, the method comprising:
   retrieving data from a first region of virtual memory that has been allocated to the program;
   compressing the data using a lossless compression technique;
   measuring a data compression rate achieved by the lossless compression technique by identifying an amount of memory space freed by compressing the data using the lossless compression technique and identifying a ratio of the amount of freed memory space with respect to a size of the first region of virtual memory; and
   generating a notification comprising notification data indicating that the first region of virtual memory was not efficiently used by the program during execution when the data compression rate exceeds a statistical value determined from the program's memory usage.

8. The method of claim 7, wherein the data compression rate is proportional to the ratio.

9. The method of claim 8, wherein the data compression rate is equal to the ratio.

10. The method of claim 7, wherein generating the notification comprises storing notification data to a data file.

11. The method of claim 7, wherein generating the notification comprises presenting notification data in a graphical user interface (GUI).

12. The method of claim 7, further comprising:
    retrieving data from at least a second region of the virtual memory;
    compressing the data from the second region of the virtual memory;
    measuring a second data compression rate for the compressed data from the second region of the virtual memory; and
    generating a notification comprising notification data indicating that the second region of the virtual memory was not efficiently used by the program during execution when the second data compression rate exceeds the statistical value determined from the application's memory usage.

13. A machine readable storage, having stored thereon a computer program having a plurality of code sections comprising:
    code for retrieving data from a first region of virtual memory that has been allocated to the program;
    code for compressing the data using a lossless compression technique;
    code for measuring a data compression rate achieved by the lossless compression technique by identifying an amount of memory space freed by compressing the data using the lossless compression technique and identifying a ratio of the amount of freed memory space with respect to a size of the first region of virtual memory; and
    code for generating a notification comprising notification data indicating that the first region of the virtual memory was not efficiently used by the program during execution when the data compression rate exceeds a threshold value.

14. The machine readable storage of claim 13, wherein the data compression rate is proportional to the ratio.

15. The machine readable storage of claim 14, wherein the data compression rate is equal to the ratio.

16. The machine readable storage of claim 13, wherein said code for generating the notification comprises code for storing data to a data file.

17. The machine readable storage of claim 13, wherein said code for generating the notification comprises code for presenting data in a graphical user interface (GUI).

* * * * *